United States Patent [19]

Kontz

[11] 4,418,837
[45] Dec. 6, 1983

[54] AUTOMATIC CUP DISPENSING APPARATUS

[75] Inventor: Robert F. Kontz, Toledo, Ohio

[73] Assignee: Owens-Illinois, Inc., Toledo, Ohio

[21] Appl. No.: 280,046

[22] Filed: Jul. 6, 1981

[51] Int. Cl.³ .................. B65H 3/28; B65H 5/22; B65G 59/06

[52] U.S. Cl. .................. 221/222; 221/236; 221/278

[58] Field of Search ............... 221/221, 222, 223, 236, 221/297, 304, 241, 278, 242

[56] References Cited

U.S. PATENT DOCUMENTS

| | | | |
|---|---|---|---|
| 3,426,941 | 2/1969 | Hovekamp | 221/222 |
| 3,591,047 | 7/1971 | Buhle | 221/278 X |
| 3,712,483 | 1/1973 | Messervey | 221/222 X |
| 3,840,150 | 10/1974 | Kinney | 221/222 |
| 4,288,003 | 9/1981 | Fries, Jr. | 221/222 X |

FOREIGN PATENT DOCUMENTS

| | | | |
|---|---|---|---|
| 1632020 | 8/1970 | Fed. Rep. of Germany | 221/278 |
| 6415253 | 7/1966 | Netherlands | 221/222 |

*Primary Examiner*—Robert B. Reeves
*Assistant Examiner*—Russell D. Stormer
*Attorney, Agent, or Firm*—J. R. Nelson; M. E. Click

[57] ABSTRACT

An automatic cup dispenser for dispensing cups at high speeds and at predetermined intervals from a stack of cups wherein each cup includes a bottom wall, a side wall and a peripheral lip comprising a plurality of opposed pairs of rotors mounted for rotation about vertical axes. The rotors are supported in position such that the upper end of each rotor engages the lip of the lowermost cup in a stack. Each rotor has a helical groove in the periphery thereof for engaging the lip of the lowermost cup and guiding the cup downwardly, the helical groove of adjacent rotors extending oppositely, and adjacent rotors being driven in alternate directions. The length of each groove is such that on rotation of the rotors, the lip of the lowermost cup is engaged and moved downwardly out of the stack while the remainder of the cups in the stack are held in position by a shoulder on the rotor.

4 Claims, 6 Drawing Figures

AUTOMATIC CUP DISPENSING APPARATUS

This invention relates to automatic cup dispensing apparatus and particularly to such apparatus for dispensing cups of expanded thermoplastic material at high speeds and at predetermined intervals from a stack.

BACKGROUND AND SUMMARY OF THE INVENTION

In the manufacture of article such as cups of expanded thermoplastic material, it is essential to handle the cups during the manufacturing operation and to accurately deliver the cups at very high speeds and at predetermined time intervals to apparatus such as inspecting apparatus. The cup dispensing apparatus must operate smoothly and accurately without marking or adversely affecting the cups and should preferably be adjustable to accommodate cups of varying diameters.

Accordingly among the objectives of the present invention are to provide an automatic cup dispensing apparatus which will dispense the cups at high speeds and at predetermined intervals without affecting or marring the cups and which can be readily adjusted to accommodate cups of varying diameters.

In accordance with the invention, the automatic cup dispenser for dispensing cups at high speeds and at predetermined intervals from a stack of cups comprises a plurality of opposed pairs of rotors mounted for rotation about vertical axes, and supported in positions such that the upper end of each rotor engages the lip of the lowermost cup in the stack. Each rotor has a helical groove in the periphery thereof for engaging the lip of the lowermost cup and guiding the cup downwardly, the helical grooves of adjacent rotor extending oppositely. Adjacent rotors are driven in alternate directions. The length of each groove is such that on rotation of the rotors, the lip of the lowermost cup is engaged and moved downwardly out of the stack while the remainder of the cups in the stack are held in position by a shoulder on the rotor.

DESCRIPTION

Figure 1:
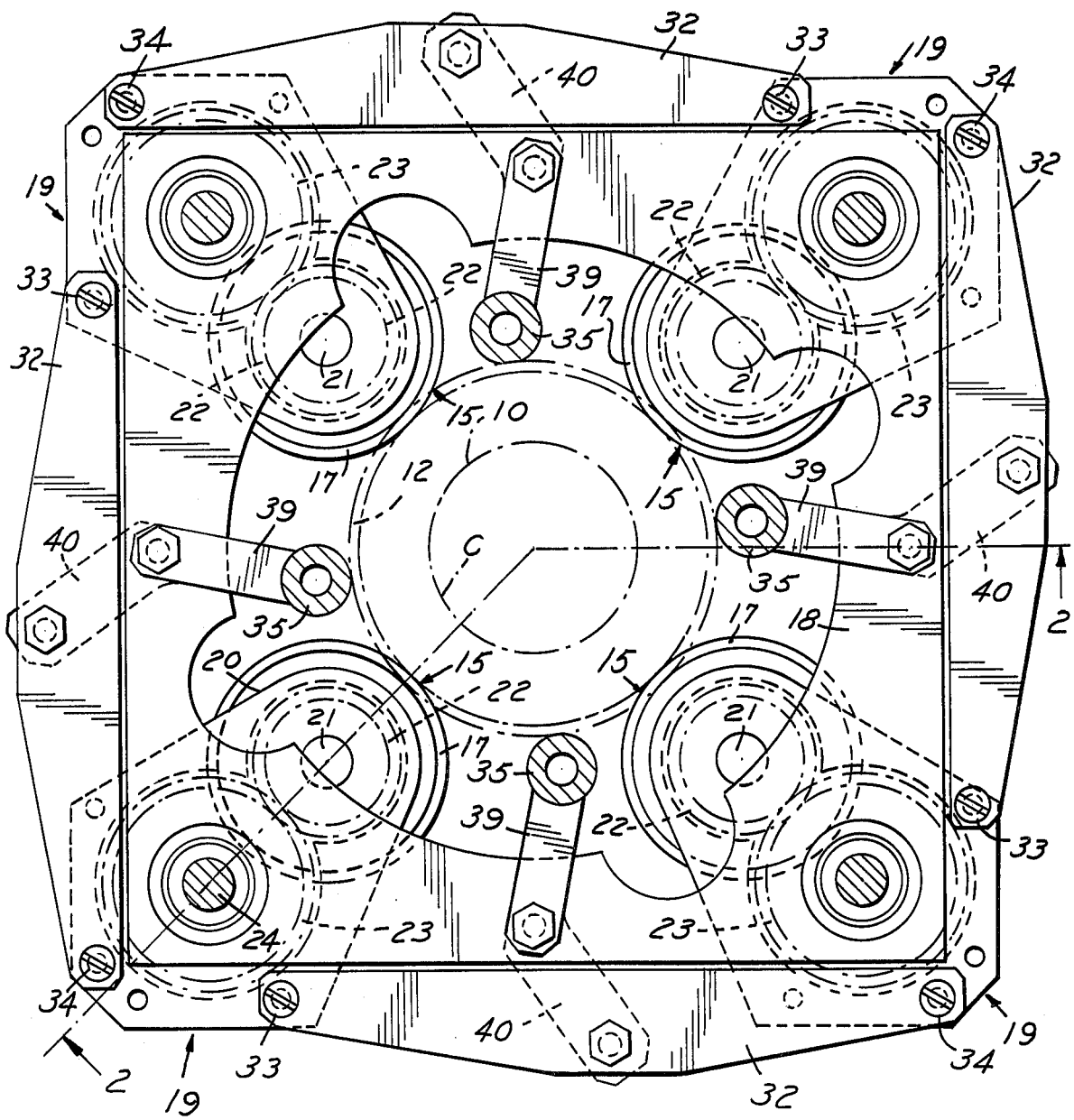
FIG. 1 is a fragmentary sectional plan view of an automatic cup dispensing apparatus embodying the invention.
Figure 2:
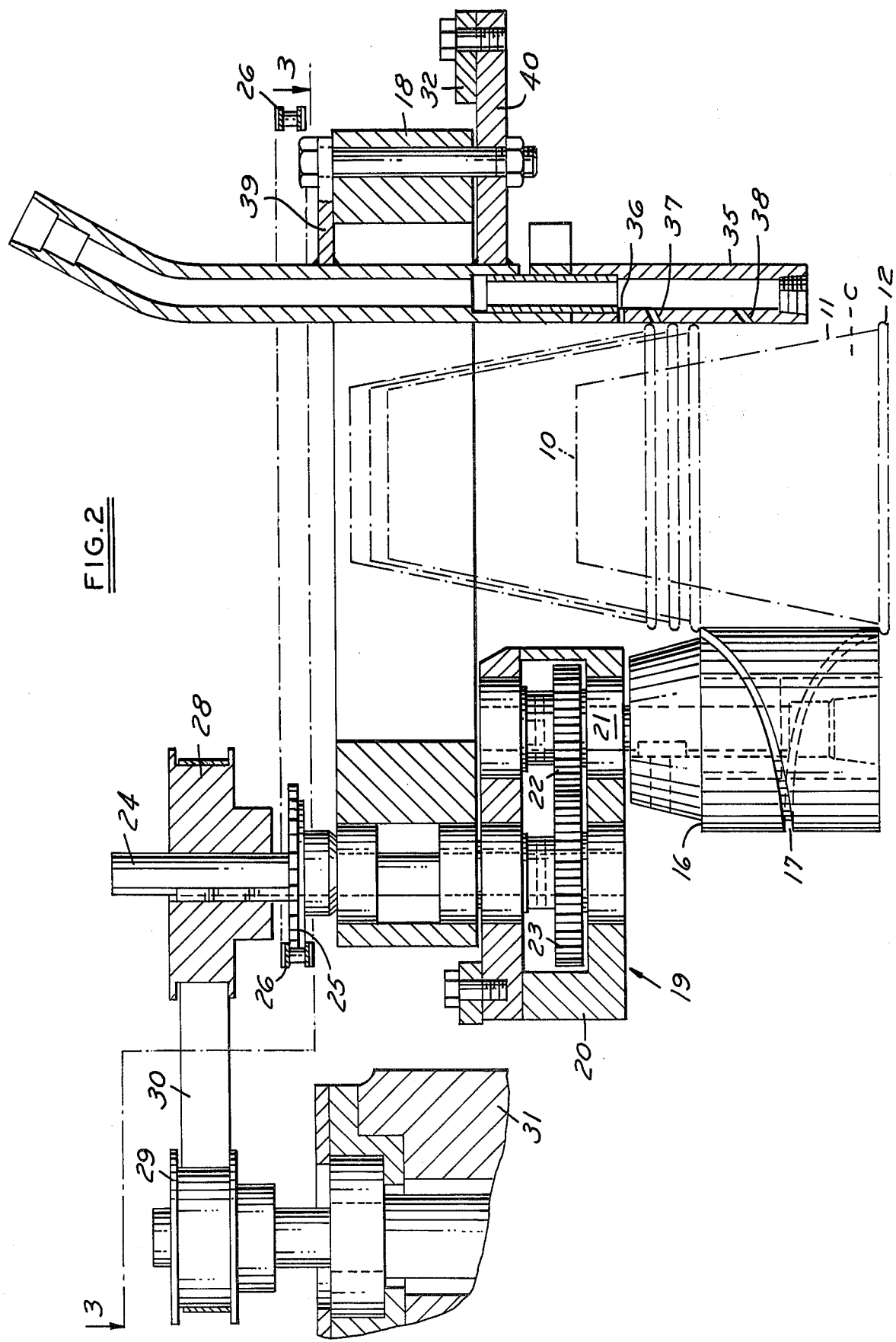
FIG. 2 is a fragmentary sectional view taken along the line 2—2 in FIG. 1.
Figure 3:
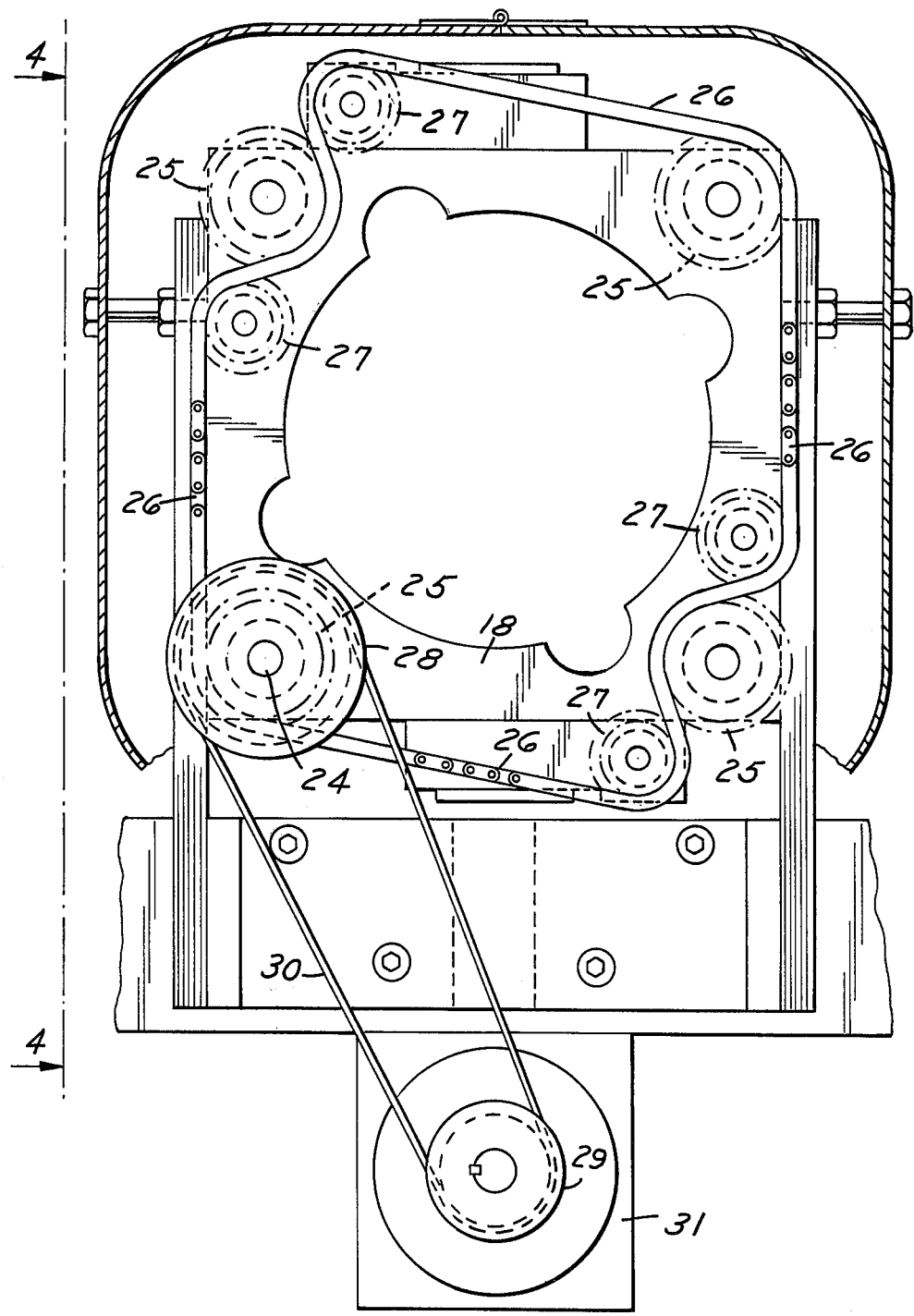
FIG. 3 is a fragmentary sectional view taken along the line 3—3 in FIG. 2.
Figure 4:
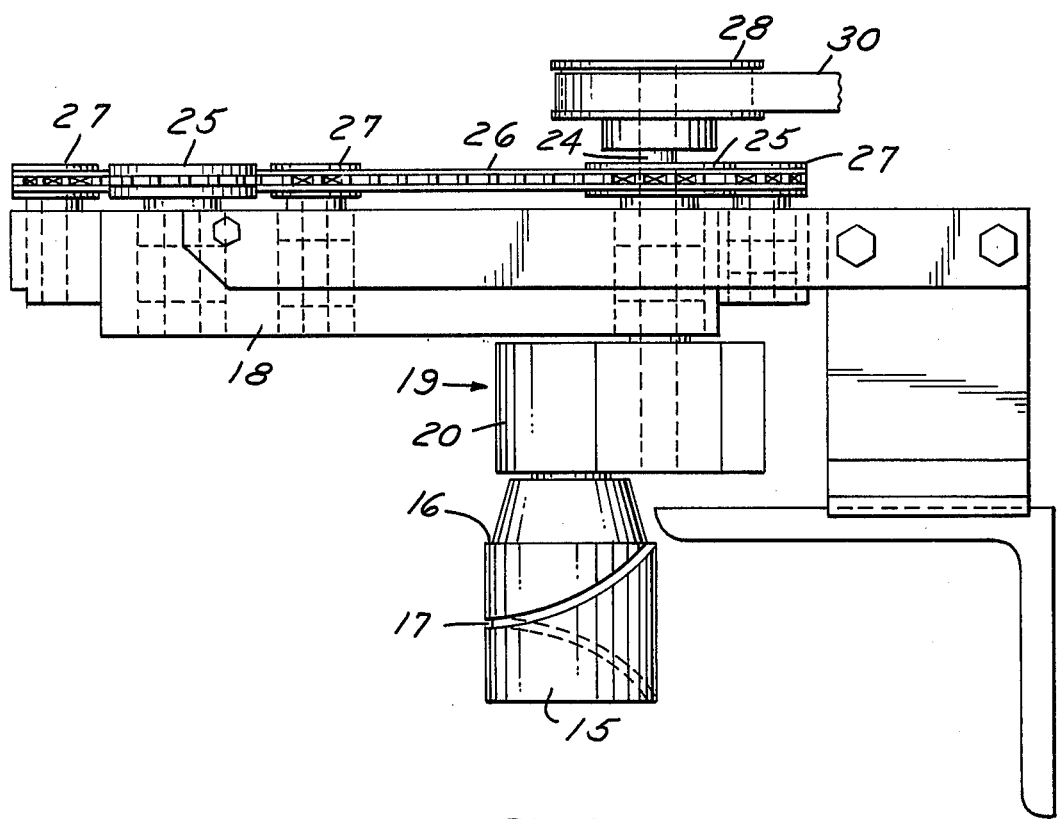
FIG. 4 is a fragmentary view taken along the line 4—4 in FIG. 3.

Referring to FIGS. 1, 2 and 3, the automatic cup dispensing apparatus embodying the invention is intended to dispense cups C of expanded thermoplastic material from a stack of inverted cups at high speeds and at predetermined accurate intervals. Each of the cups C comprises a bottom wall 10, a frusto-conical side wall 11 and a peripheral rim or lip 12 at the free end thereof. In accordance with the invention, the stack of inverted cups C is supported in the apparatus by a plurality of rotors 15, each of which has a shoulder 16 for engaging the rim or lip 12 of the lowermost cup in the stack. Each rotor further includes a helical groove 17 on the periphery thereof which is adapted to engage the rim 12 of the cup and guide the lowermost cup out of the stack downwardly while the remainder of the cups are held in the stack by the shoulder 16.

Figure 5:
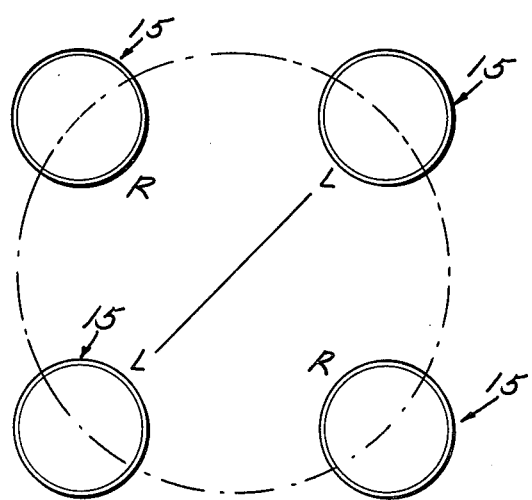
FIG. 5 is a diagrammatic view of the relative rotor directions.

In order to prevent rotation of the stack and maintain the stack in stable condition, adjacent rotors 15 have a helical groove 17 extending in opposite directions as indicated by the diagram shown in FIG. 5. The axial extent or pitch of each groove 17 is such that the lowermost cup is substantially completely withdrawn in one revolution of the rotor and before the next succeeding cup is engaged by the groove.

The groove 17 extends from the shoulder 16 about the periphery of the rotor to the lowermost end of the rotor as shown in FIG. 2.

The rotors 15 are supported on a frame 18 with each rotor 15 being rotatably mounted on an arm 19 defined by gear case 20. Gear case 20 rotatably supports a shaft 21 on which its respective rotor 15 is mounted and on which a first gear 22 is fixed. Gear 22 meshes with another gear 23 rotatably mounted within the gear case 20 on an input shaft 24 that extends externally of the gear case and is rotatably mounted in frame 18. A sprocket 25 is mounted on each input shaft and an endless drive member such as a chain 26 is trained over the sprockets to drive adjacent sprockets in alternate directions. As shown in FIG. 3, the endless chain 26 is alternately trained to drive the sprockets in alternate directions by the use of idler sprockets 27 associated with alternate sprockets 25. One of the input shafts 24 is extended to provide external power thereto through a pulley 28, 29, belt 30 and drive motor 31.

By mounting each rotor 15 on an arm 19 in the form of a gear case 20, it is possible to adjust the position of the rotors to accommodate cups of varying diameters. Each gear case 20 is interconnected to the adjacent gear case by a link 32 that is attached to the adjacent gear cases 20. By loosening the fasteners 33, 34 that connect the links 32 to the gear case 20, each gear case is permitted to swing radially inwardly and outwardly to adjust the position of its respective rotor. The fasteners 33, 34 are then tightened holding the rotors 15 in the newly adjusted position. (FIGS. 1, 6).

Figure 6:
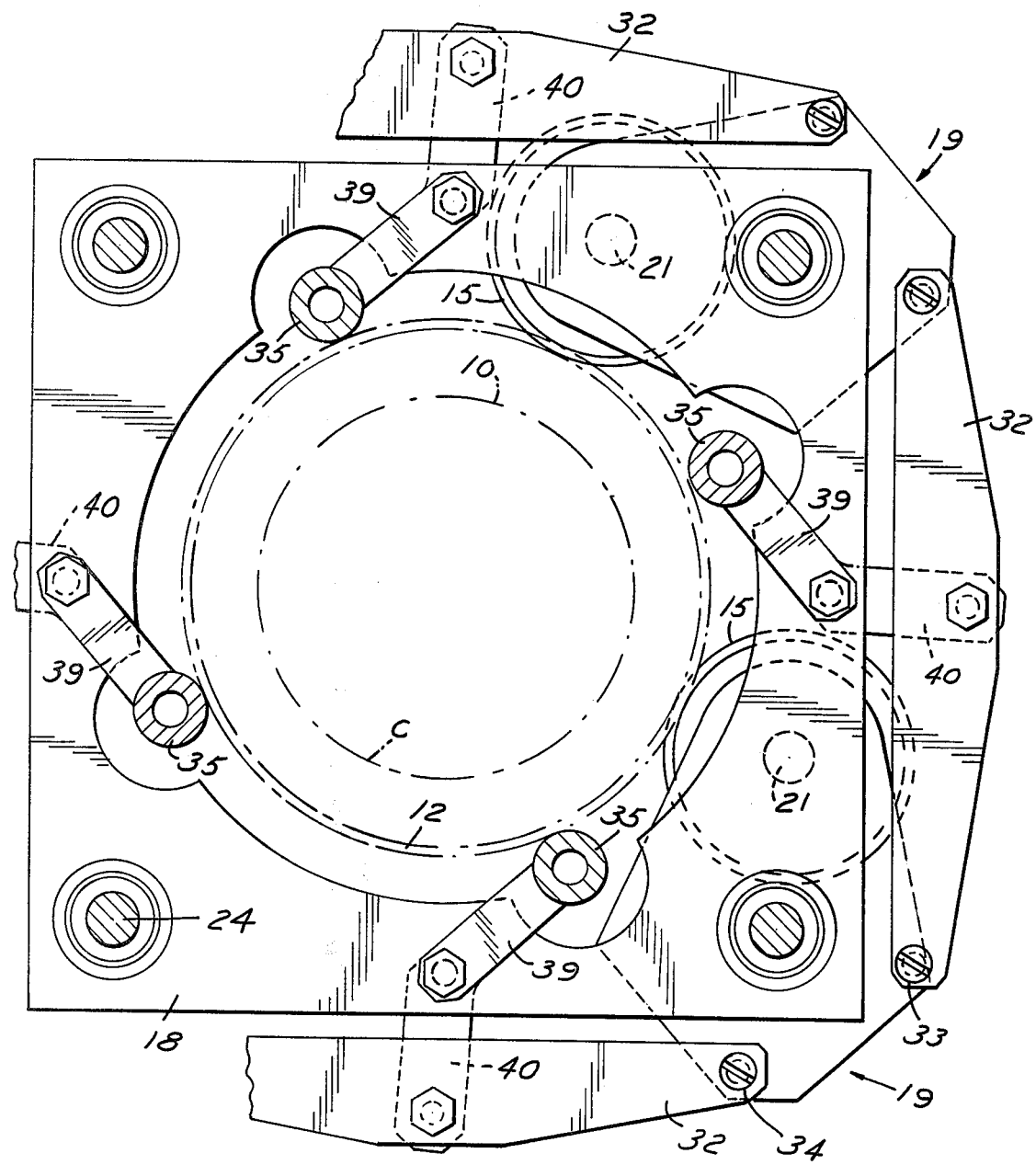
FIG. 6 is a fragmentary view similar to FIG. 1, parts being broken away, showing the apparatus in a different operative position.

As shown in FIGS. 1, 2 and 6, vertical air tubes 35 are provided about the periphery of the stack and have openings 36, 37, 38 extending radially inwardly and downwardly to facilitate removal of the lowermost cup C from the stack. Each tube 35 is mounted on one end of an arm 39 pivoted intermediate its ends to the frame 18 and having an extension 40 pivoted to the link 32. When the link is shifted in a manner to change the position of the gear cases 20, the position of the tubes 35 is also automatically changed to accommodate the cups of different diameters.

I claim:

1. An automatic cup dispenser for dispensing cups at high speeds and at predetermined intervals from a stack of cups wherein each cup includes a bottom wall, a side wall and a substantially circular peripheral top rim comprising means for guiding a stack of inverted cups downwardly, a frame, a plurality of opposed pairs of rotors mounted on said frame for rotation about vertical axes, each rotor having a shoulder for engaging the lip of the lowermost cup in a stack, means for supporting said rotors on said frame in positions such that the upper end of each said rotor engages the lip of the lowermost cup in the stack, said support means comprising an arm individual to each said rotor on which said rotor is mounted, said arm being mounted for swinging movement on said frame, and comprising a gear case, said gear case rotatably supporting a shaft on which its respective rotor is mounted, said gear case having a gear on said shaft and a second gear meshed with said first gear, an input shaft associated with said second gear, sprockets mounted on the input shafts of said gear cases, endless drive means interconnecting said sprockets in a manner to drive alternate second gears in opposite directions, an input drive to at least one of said input shafts, each rotor having a helical groove in the periphery thereof for engaging the lip of the lowermost cup and guiding the cup downwardly, the helical groove of adjacent rotors extending oppositely, a link connecting each adjacent arm, means for locking each said link to its respective arm such that when said links are locked to said arms, the adjusted position of said arms and in turn rotors on the arms radially inwardly or outwardly is locked in position, said locking means being releasable to permit adjustment of said arms and in turn said rotors radially inwardly and outwardly, means on said frame for driving adjacent rotors in alternate directions, the length of each said groove being such that upon rotation of the rotors, the lip of the lowermost cup is engaged and moved downwardly out of the stack while the remainder of the cups in the stack are held in position by the shoulder on the rotors, means for adjusting the position of each said rotor on said frame radially inwardly and outwardly to accommodate cups of different sizes, and an air tube supported on at least some of said links about said stack, each said tube axially disposed substantially parallel to said stack and including jet openings for directing air on the lowermost cup to facilitate the removal of the cup from the stack.

2. The automatic cup dispenser of claim 1 wherein each of said air tubes is supported on one of said links by a connection on one end of an arm that is pivoted intermediate its ends and fastened at its other end to said link.

3. The automatic cup dispenser of claim 1 wherein the endless drive means engages idler sprockets associated with alternate ones of said sprockets on the input shafts, whereby said adjacent ones of said sprockets are driven in a direction of rotation opposite the driven rotation of the other of said sprockets on the input shafts thereby driving adjacent second gears in opposite directions.

4. An automatic cup dispenser for dispensing cups at high speeds and at predetermined intervals from a stack of cups wherein each cup includes a bottom wall, a side wall and a substantially circular peripheral top rim comprising means for guiding a stack of inverted cups downwardly, a frame about said stack, a plurality of pairs of cylindrical rotors each having an annular shoulder and a helical groove extending from said shoulder for engaging the lip of the lowermost cup in a stack, the helical groove of adjacent rotors extending oppositely, the length of each said groove being such that upon rotation of the rotors in unison, the lip of the lowermost cup is engaged and moved downwardly out of the stack while the remainder of the cups in the stack are held by the rotor shoulders, means for supporting said rotors on said frame in positions such that the upper end of each said rotor engages the lip of the lowermost cup in the stack, said support means comprising a gear case for each rotor and including
a shaft, mounting the rotor for rotation thereby,
a first gear connected on said shaft,
an input shaft,
a second gear in mesh with the first gear and connected on said input shaft, each said input shaft being rotatably mounted in said frame, a sprocket connected on said input shaft externally of the gear case, a chain drive member including chain idlers arranged and connected for said chain to engage the sprockets and drive all of them, but alternately in opposite directions of rotation, and a drive motor, one of said input shafts being driveably connected to said motor.

* * * * *